(12) United States Patent
Takemura et al.

(10) Patent No.: US 6,467,813 B1
(45) Date of Patent: Oct. 22, 2002

(54) REINFORCEMENT FITTING

(75) Inventors: Yukio Takemura; Kikuo Saito; Kohtaro Morikawa, all of Osaka (JP)

(73) Assignee: Waterworks Technology Development Organization Co., Ltd., Osaka (JP)

( * ) Notice: Subject to any disclaimer, the term of this patent is extended or adjusted under 35 U.S.C. 154(b) by 0 days.

(21) Appl. No.: 09/163,718

(22) Filed: Sep. 30, 1998

(30) Foreign Application Priority Data

Apr. 24, 1998 (JP) .......................................... 10-115335

(51) Int. Cl.⁷ ................................................ F16L 35/00
(52) U.S. Cl. ....................................... 285/114; 285/337
(58) Field of Search .................................. 285/337, 368, 285/114

(56) References Cited

U.S. PATENT DOCUMENTS

| | | | | |
|---|---|---|---|---|
| 3,594,023 A | * | 7/1971 | Yano ........................... | 285/337 |
| 4,610,471 A | * | 9/1986 | Halen et al. ................. | 285/337 |
| 4,867,488 A | * | 9/1989 | Jones .......................... | 285/337 |

FOREIGN PATENT DOCUMENTS

| | | | | |
|---|---|---|---|---|
| CA | 814289 | * | 6/1969 | ................. 285/337 |
| DE | 551768 | * | 6/1932 | ................. 285/337 |
| FR | 1580069 | * | 8/1969 | ................. 285/337 |
| FR | 2351564 | * | 12/1977 | ................. 285/368 |

* cited by examiner

*Primary Examiner*—Dave W. Arola
(74) *Attorney, Agent, or Firm*—Muramatsu & Associates

(57) ABSTRACT

A reinforcement fitting provides shrinkage and expansion capabilities while maintaining sealability at the connection between existing pipes. The reinforcement fitting includes an externally fitting portion with an inside diameter that can fit over the existing pipes, a contact member installed in a recessed portion formed on the inside of the externally fitted portion having a tapered contact surface and a contact portion to contact with an outer surface of one of the existing pipes wherein contact resistance with one of the existing pipes increases when an external force is exerted in the direction to separate the existing pipes, an engagement portion which is able to engage with a flange portion of the other existing pipe when the external force is exerted in the direction to separate the existing pipes, and a cut out portion formed at an outer side of the reinforcement fitting for establishing a clearance for a protruded portion used in connecting the existing pipes.

8 Claims, 3 Drawing Sheets

REINFORCEMENT FITTING

BACKGROUND OF THE INVENTION

1. Field of the Invention

The present invention relates to a reinforcement fitting, and more specifically, to a reinforcement fitting to be installed to connections of existing, pipes such as underground water pipes for increasing the earthquake resistance.

2. Description of the Related Art

The longitudinal end portion of, for example, each of the underground water pipes has a joint structure for connecting other pipes, and via this joint structure, a plurality of pipes are connected one after another. Of the existing pipes set up throughout the country, part has a joint structure equipped with an aseismatic mechanism which can shrink and expand with pipe end portions allowed to maintain water-tightness, but the joint structure equipped with an aseismatic mechanism is not necessarily used in the connections of all pipes. Rather the joint structure without an aseismatic mechanism is mainly used in the underground water pipes today. In the case of the joint structure not equipped with the aseismatic mechanism, either one of the pipes comes off from the joint portion when large crustal movements such as earthquakes, etc. occur, and accidents such as water leakage, etc. occur. In countries where earthquakes are likely to occur, it is desirable to build all the connections of underground pipes of a pipe joint structure equipped with an aseismatic mechanism. In actuality, small part of the water pipes is now being replaced with joints equipped with an aseismatic mechanism.

However, the conventional joint structure equipped with the aseismatic mechanism has a complicated construction and is expensive, and is not always easy to install. In the case of cast iron pipes buried in earth over a long period of time, connection members such as bolts, nuts, etc. composing the joint structure may rust, and thus, even removal of these pipes involves hard and tiresome work. Consequently, it is technically and economically difficult and not realistic to replace all the connections of the existing pipes with the joint structure equipped with the aseismatic mechanism in a short time.

Therefore, development of reinforcement fittings has been strongly desired in order to provide an aseismatic mechanism to the connections of existing pipes with no aseismatic mechanism at high efficiency and at low cost. Under these circumstances, the object of this invention is to provide reinforcement fittings at high efficiency and at low cost to the connections of existing pipes.

SUMMARY OF THE INVENTION

The above object will be achieved by the inventions recited in the claims. That is, the reinforcement fitting according to this invention comprises an externally fitted portion which can provide shrink-expand capabilities with sealability held at connections between existing pipes to the connections of the existing pipes and has an inside diameter that can be externally fitted to the existing pipe, a contact member which is internally fitted to the recessed portion formed inside this externally fitted portion and has a tapered contact surface as well as a contact portion in contact with one of the existing pipes in the circumferential direction, and whose contact resistance with one of the existing pipes increases when an external force is exerted in the direction that separates the existing pipes, an engagement portion which can engage with a flange portion of the other existing pipe when the external force is exerted in the direction to separate the existing pipes.

Because the reinforcement fitting is configured in this way, the reinforcement fitting according to this invention is externally fitted over the whole connections in a manner to cover the connector from the outside without removing the connections of the existing pipes and with connections of the existing pipes held intact, and can be extremely easily installed. In addition, when the external force is exerted in the direction to separate the existing pipes due to crustal movement such as earthquakes, the aseismatic mechanism can be effectively exhibited by the action of the contact member which increases contact resistance, and the engagement portion and existing pipes contact with each other for the first time when the external force is exerted in the direction to separate the existing pipes, and therefore, it can exhibit function to permit shrinkage and expansion movement of the existing pipes. In addition, the cost can be held to a low level due to the simpler construction as compared to that of the conventional aseismatic joint equipped with shrink-expansion mechanism.

As a result, according to this invention, it is able to provide a reinforcement fitting that is able to give the aseismatic mechanism to the connections of existing pipes in high efficiency and at low cost.

The contact portion of the contact member forms an arc along the outer surface of the exiting pipe and has a V-shape in cross section. The contact member may be formed with a plurality of members which are placed in the recessed portion.

When configured in this way, if the reinforcement fitting is installed by externally fitting over the existing pipe, the contact portion of the contact member is able to be brought in line contact with the outer surface of the existing pipe, and this is desirable because the resistance to the travel direction of the existing pipes can be increased. In addition, because the cross section of the contact portion of the contact member has a nearly V-letter form, the contact portion cuts into the peripheral surface of the existing pipe when the reinforcement fitting is installed, and this is preferable because the resistance to the travel direction of the existing pipes can be increased, and in addition, because a plurality of contact portions exist, resistance against the travel of the existing pipe can be distributed, and this is desirable because the durability of the contact portion can be maintained in a high level.

In addition, it is preferable that the contact portion of the contact member is brought in contact with at least more than 30% of the circumferential length of the existing pipe.

If configured in this way, resistance to the travel action of the existing pipe can be constantly maintained high. If the length in contact with the existing pipe is less than 30% of the circumferential length of the existing pipe, the contact resistance to the earthquake which may exert a large external force is small and this is not desirable. It is still more preferable that the contact portion of the contact member be in contact with more than 80% of the circumferential length of the existing pipe.

Furthermore, when the reinforcement fitting is installed to the connections of the existing pipes, it is preferable that the tip end of the engagement portion be formed to have sufficient length that can reach the vicinity of the tip end of the other existing pipe in the axial direction of the existing pipe.

Because it is configured in this way the flexibility allowance corresponding to the travel enable distance of the existing pipe against the external force to separate the existing pipes can be maximized with the water tightness maintained.

DETAILED DESCRIPTION OF THE PREFERRED EMBODIMENTS

Figure 1A:
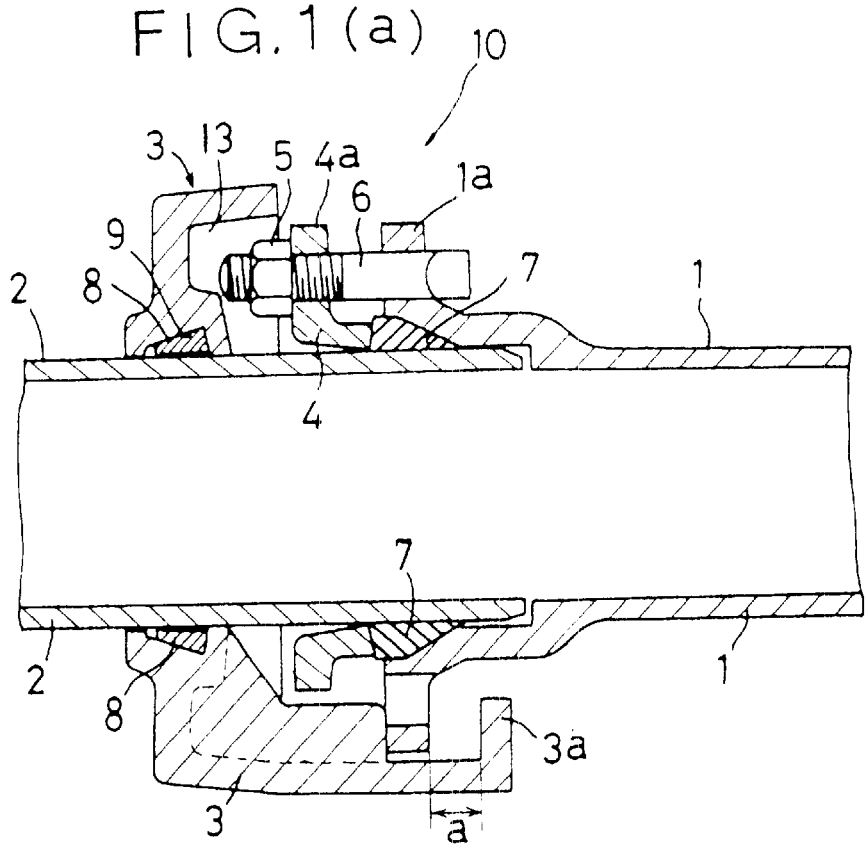
FIGS. 1(a) and 1(b) are cross-sectional views showing an installation condition of the reinforcement fitting of the first embodiment according to this invention.

Referring now to the drawings, preferred embodiments according to the invention will be described in detail hereinafter.

Figure 1B:
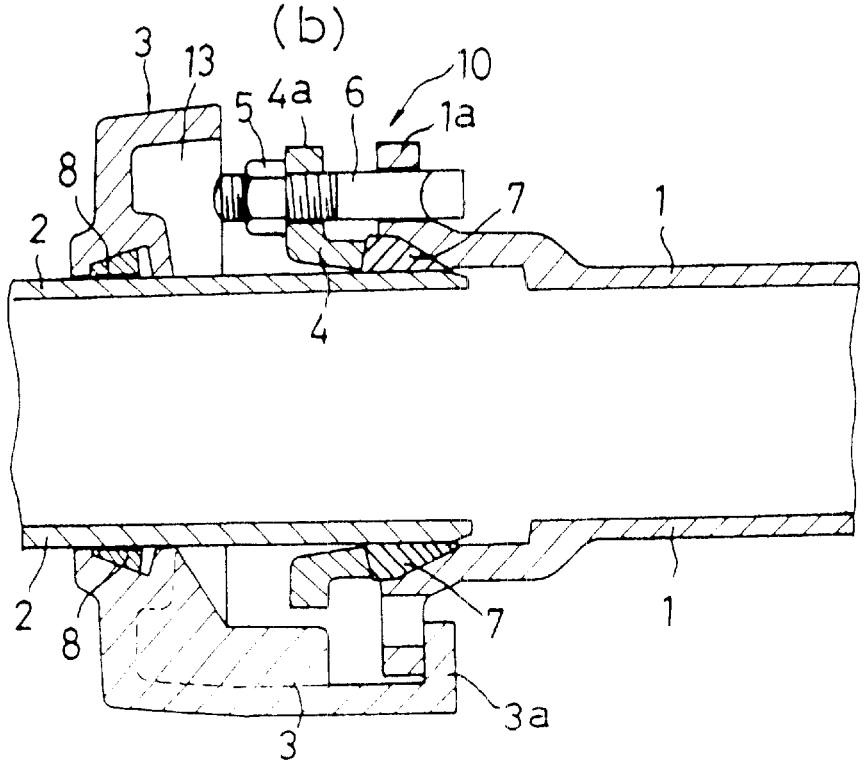

FIGS. 1(a) and 1(b) shows the connections 10 of the end portions of cast iron existing pipes 1, 2 such as underground water pipes, etc., and show the condition in which the reinforcement fitting 3 of the present embodiment is installed to the connections 10. The existing pipe 1 has the end portion of a large-diameter socket construction, and the existing pipe 2 is an inserting pipe that is inserted in the socket construction of the end portion of the existing pipe 1. These existing pipes 1, 2 are connected and fixed via a retaining ring 4 externally fitted over the existing pipe 2 with water-tightness maintained to each other. That is, the flange portion 4a of the retainer ring 4 and the flange portion 1a of the existing pipe 1 are connected and fixed to each other by bolts 6 and nuts 5 while air-tightness is achieved by intervening a rubber ring 7 which is a sealing member. This end portion connecting construction of existing pipes is a construction that can stand water pressure, but depends only on the strength of each component member when earthquakes occur and has no special aseismatic structure, and has a little shrinkage and expansion rate with respect to a crustal movement.

Figure 2:
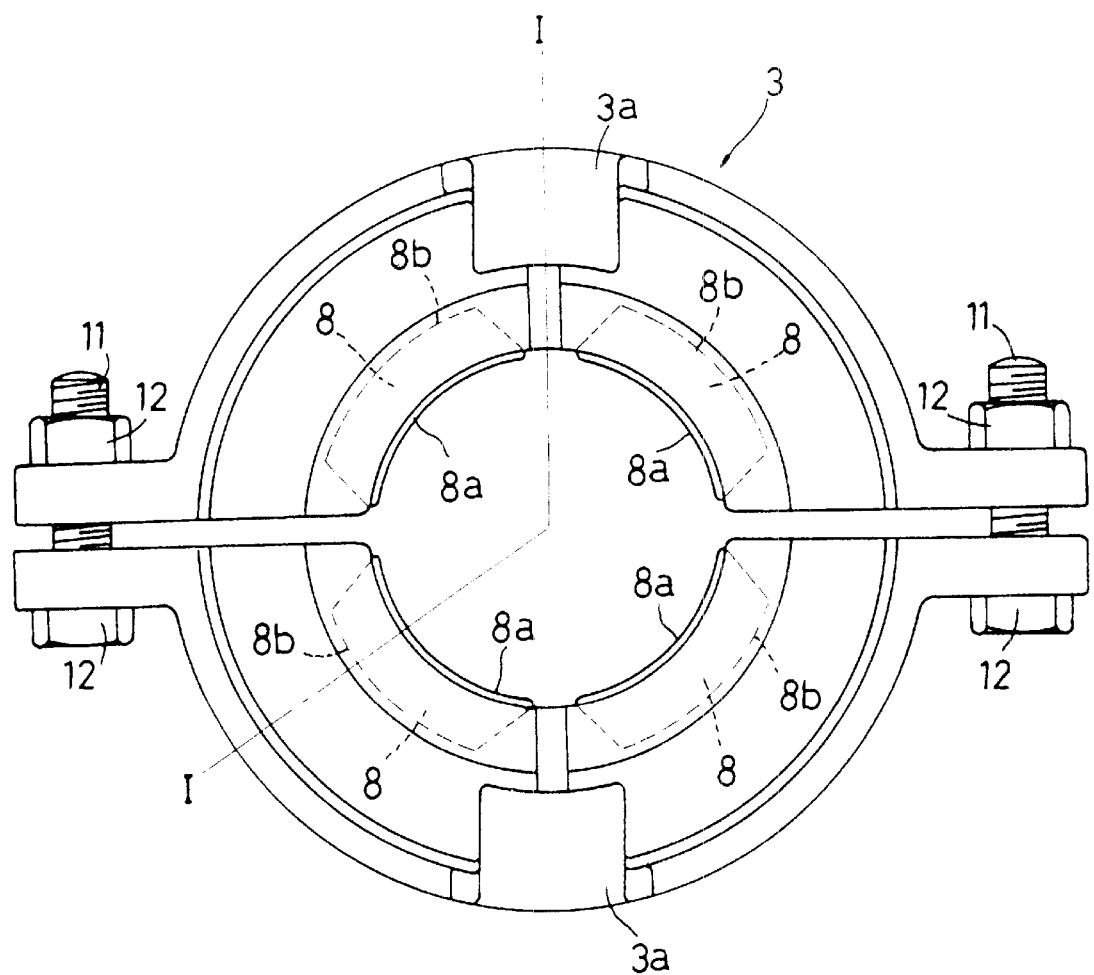
FIG. 2 is a side view of the reinforcement fitting of FIG. 1.

Therefore, by installing the reinforcement fitting 3 whose side construction is shown in FIG. 2 to the connection portion, the existing pipes can be prevented from exceeding the shrinkage and expansion rate of them and coming off and as a result, they can be provided with excellent aseismatic capabilities. This reinforcement fitting 3 is of a two-split construction equipped with an inside diameter that can be externally fitted over the existing pipes 1, 2. This reinforcement fitting 3 is able to install and fix two portions of the flange portions of the right and left end portions as seen from the side to the existing pipes by externally fitting this reinforcement fitting 3 over the outer surface in the vicinity of the connections 10 of the existing pipes and then combining bolts 11 and nuts 12. This installation and fixation is achieved by passing the bolt 11 through the through hole (not illustrated) formed on the flange portion and then tightening the nut 12. Another set of bolt 11 and nut 12 can be respectively provided in parallel with each set of bolt 11 and nut 12 in FIG. 2 either in the front or back thereof, and tightening force for the existing pipes may be increased. The number of these fixing jigs may be changed as required in accord with the applications, sizes, etc.

Four claw members 8, arcuate contact members extending in the circumferential direction of the existing pipe, are placed to bring in nearly equal contact with the outer surface of the existing pipe, respectively, on inner portions which are externally fitted portions of the reinforcement fitting 3 for externally fitting over the existing pipes. When the reinforcement fitting 3 is installed to the peripheral surface of the existing pipes and tightened and fixed by the bolts 11 and the nuts 12, the tip end of the four claw members 8 lightly cut into the peripheral surface of the existing pipes 1, 2. These claw members 8 have tip ends 8a which are contact portions in contact with the existing pipe, in the sharpened edge form, and the top surface 8b is tapered with respect to the axial direction of the existing pipe, so that the cut-in of the claw member 8 to the existing pipe with respect to the separation movement of both existing pipes is designed to increase by the so-called wedge effect. This claw member 8 is installed in parallel in the circumferential direction in two member for each of split reinforcement fitting portions, respectively, and is designed to come in contact with nearly 80% or more of the circumferential direction of the existing pipes. Increasing the contact length in this way is able to increase the cut-in length of the tip end edge portion associated with not only the initial travel of the existing pipe but also with the progress of the travel, and the resistance to the separation travel of the existing pipes can be made extremely large, and this is preferable because the effects for suppressing the separation travel can significantly increase. By the way, when the contact of the claw member 8 with the existing pipe 2 is less than 30% of the circumferential length of the existing pipe, the contact resistance is unable to be increased, and this is not desirable, and it is preferable that it be 30%, or more. It is possible to further increase the number of claw member and shorten the circumferential length of the individual claw member.

By externally fitting the reinforcement fitting 3 shown in FIG. 2 over one of the existing pipes 2, and arranging the engagement portion 3a an L shape in cross section formed at the center portion of each reinforcement fitting 3 of a semi-circular cross section forming a two-split structure at the position to engage with the flange portion 1a of the other existing pipe 1 when the external force for separating one of the existing pipes 2 from the other existing pipe 1, a flexibility allowance is obtained between the inner surface of the engagement portion 3a and the flange portion 1a of the other existing pipe 1, as shown FIG. 1(a). In this case, it is preferable that the head end of the engagement portion 3a is formed to reach the vicinity of the head end of one existing pipe 2 because a large flexibility allowance can be provided. By the way, FIG. 1 shows the condition in which the reinforcement fitting 3 is externally fitted over the existing pipes 1, 2 and the reinforcement fitting 3 in FIG. 1 shows the cross-sectional structure taken on the line I—I of FIG. 2.

Figure 3:
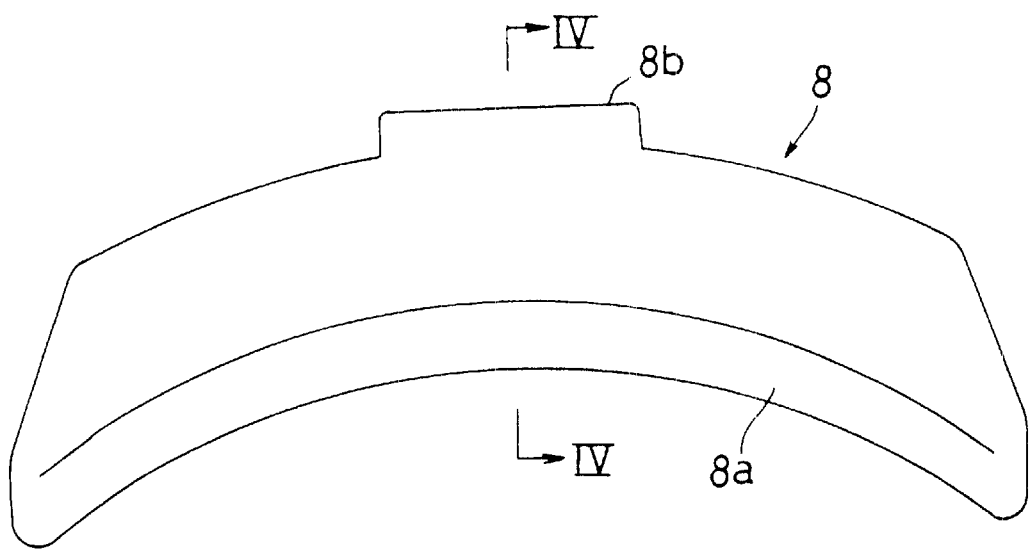
FIG. 3 is a side view of the claw member used for the embodiment of FIG. 1.
Figure 4:
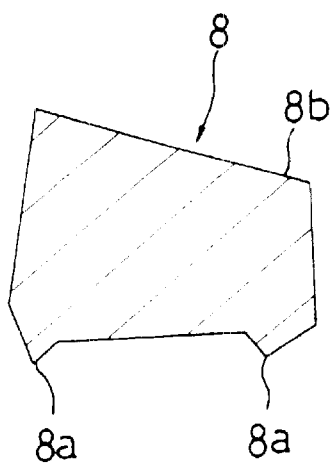
FIG. 4 is a cross-sectional view taken on line IV—IV of the claw member of FIG. 3.

On the inside of the contact portion of the reinforcement fitting 3 in contact with the peripheral surface of one existing pipe 2, a recessed portion 9 is provided for movably installing therein the claw member 8 whose construction is shown enlarged in FIGS. 3 and 4. The inside top of this recessed portion 9 and the top surface 8b of the claw member 8 are parallel to each other, but they are tapered relative to the axial direction of the existing pipe. The taper of the inside top of the recessed portion 9, as shown in FIG. 1, is so configured that the inner space of the recessed portion 9 is decreased as both existing pipes go toward the direction to separate, and when the external force is exerted in the direction to separate the existing pipes, a wedge effect is generated between the claw member 8 following the move of one existing pipe 2 and the inside top of the recessed portion 9 of the reinforcement fitting and the inside top of the recessed portion 9 presses the top surface 8b of the claw member 8. By this pressing operation, the sharpened head end of the claw member 8 still more cuts into the peripheral surface of the existing pipe 2. As described above, the more exerted the external force in the direction for separating the existing pipes, the greater effects achieved are for suppressing the separating action of both existing pipes.

In addition, on the peripheral side of the reinforcement fitting 3, a cut-out portion 13 is formed for spatially evading the contact of the protruded portion of fixing jigs such as a combination of bolts and nuts formed on the connections between existing pipes so that reinforcement fittings 3 can be installed as close to the connections between existing pipes as possible. This cut-out portion 13 may not be of a recessed portion as shown in FIG. 1 and may be a simple space if it can evade contact with connections of existing pipes.

Further description will be made on the claw member 8. As shown in FIG. 4 in which the cross-sectional form is enlarged, the claw member 8 has linear protrusions 8a of a V-shape in cross section extended and expanded along the peripheral surface of the existing pipe 2 at two places away from each other in the axial direction of existing pipes. This V-shape protrusion 8a comes in contact with the peripheral surface of the existing pipe 2, and if any condition in which the existing pipe 2 moves in the direction for one existing pipe 2 to separate from the other existing pipe 1 occurs, the V-shape protrusion 8a deeply cuts into the peripheral surface of the existing pipe 2 and a large contact resistance is generated at the contact portion between the protrusion 8a and the peripheral surface of the existing pipe 2. That is, when the external force is exerted in the direction for separating the existing pipes 1, 2, as shown in FIG. 1(b), the protrusion 8a of the claw member moves only by the flexibility allowance and temporarily stops with the protrusion 8a of the claw member cut into the peripheral surface of the existing pipe 2. However, when the further greater external force is exerted, the protrusion 8a of the claw member cuts into the peripheral surface of the existing pipe 2 because of the wedge effects of contact surfaces of the inside top portion of the recessed portion 9 and the top surface 8b of the claw member 8, thereby strongly suppressing the separating action of the existing pipe 2. During this period, the pipes are maintained water-tightly by the rubber ring 7 and water does not leak from the pipe inside, and needless to say, no foreign matter mixes in the pipe inside from the pipe outside.

The reinforcement fitting of this embodiment has the aforementioned construction, and the construction is simpler than the joint equipped with the conventional aseismatic mechanism and therefore the cost is lowered, and the reinforcement fitting can be easily installed to the connections between existing pipes with practically no aseismatic structure. In addition, because a large load is not applied to connections between existing pipes because of the existence of the flexibility allowance with respect to elongation and expansion of existing pipes, and the aseismatic function does not depend on the strength of the connections of the existing pipes, damage or destruction of existing pipes against crustal movements can be effectively avoided.

[Another Embodiment]

(1) In the case of the above embodiment, the reinforcement fitting 3 is of a two-split structure, and after externally fitting over the existing pipe, the two flange portions at right and left as seen from the side are fixed by a combination of bolts and nuts, but the one end portion may be of a hinge structure to be connected from the beginning, and after externally fitting over the existing pipe, the other end portion may be fixed using the fixing jig such as a combination of a bolt and a nut.

(2) In the case of the above embodiment, an example of inserting a bolt through a hole formed at the flange portion and tightening it with a nut to fix is shown for the combination of bolts and nuts but the bolt may be rotatably installed to one of the flange portion and a groove may be formed at the other flange so that the bolt is able to be inserted, and when two-split type reinforcement fitting portion is externally fitted over the existing pipe and fixed, the bolt may be rotated to fit into the groove and thereafter the two-split type reinforcement fitting portion may be tightened with a nut.

(3) In place of the reinforcement fitting of a two-split structure shown in the above embodiment, it may be of a three-split structure or a four-split structure.

(4) The number of protrusions 8a may be varied as required, and when the number is increased, the protrusions act to further increase the contact resistance with the outer surface of the existing pipe 2. In addition, the profile may be varied in various forms if it can increase the contact resistance with the existing pipe as the existing pipe moves.

What is claimed is:

1. A reinforcement fitting for achieving shrinkage and expansion capabilities while maintaining fluid sealability at a connection point between existing fluid pipes when mounted on the connection point, comprising:

an externally fitting portion having a split structure with an inside diameter that can externally fit over the existing fluid pipes without loosening or disconnecting the connection point of the existing fluid pipes a recessed tapered portion formed on an inside of the externally fitted portion with the diameter of the taper decreasing in a direction away from said connection point;

a contact member which is internally fitted into said recessed tapered portion and has a tapered contact surface complimentary to said tapered portion, the contact member having a contact portion to come in contact with an outer surface of one of the existing fluid pipes thereby increasing contact resistance with one of the existing fluid pipes when an external force is exerted in a direction to separate the existing fluid pipes from each other;

an engagement portion which is able to engage with a flange portion of the other existing fluid pipe when the external force is exerted in the direction to separate the existing fluid pipes; and a cut out portion formed at an outer side of the reinforcement fitting for establishing a clearance for a protruded portion used in connecting the existing fluid pipes.

2. A reinforcement fitting according to claim 1, wherein the contact portion of the contact member has an arcuate structure along the outer surface of the existing fluid pipe and has a V-shape in cross section, and wherein a plurality of the contact members are arranged in the recessed portion.

3. A reinforcement fitting according to claim 2 wherein the contact member has a plurality of contact portions which draw an arc along the outer surface of the existing fluid pipe and are arranged to come nearly in equal contact with the outer surface of the existing fluid pipe.

4. A reinforcement fitting according to claim 1, wherein the contact portion of the contact member is brought in contact with more than 30% of a circumferential length of the existing fluid pipe.

5. A reinforcement fitting according to claim 1, wherein the contact portion of the contact member is brought in contact with more than 80% of a circumferential length of the existing fluid pipe.

6. A reinforcement fitting according to claim 1 wherein a head end of the engagement portion is formed in a length that can reach close to a head end of one of the existing fluid pipes in an axial direction of the existing fluid pipes when the reinforcement fitting is attached to the connection point between the existing fluid pipes.

7. A reinforcement fitting for achieving shrinkage and expansion capabilities while maintaining fluid sealability at a connection point between existing fluid pipes when mounted on the connection point, comprising:

an externally fitting portion having a split structure with an inside diameter that can externally fit over the existing fluid pipes without loosening or disconnecting the connection point of the existing fluid pipes a recessed tapered portion formed on an inside of the externally fitted portion with the diameter of the taper decreasing in a direction away from said connection point;

a contact member which is internally fitted into said recessed tapered portion and has a tapered contact surface complimentary to said tapered portion, the contact member having a contact portion to come in contact with an outer surface of one of the existing fluid pipes thereby increasing contact resistance with one of the existing fluid pipes when an external force is exerted in a direction to separate the existing fluid pipes from each other;

an engagement portion which is able to engage with a flange portion of the other existing fluid pipe when the external force is exerted in the direction to separate the existing fluid pipes, a head end of the engagement portion being formed in a length that can reach close to a head end of one of the existing fluid pipes in an axial direction of the existing fluid pipes when the reinforcement fitting is mounted on the connection point between the existing fluid pipes; and a cut out portion formed at an outer side of the reinforcement fitting for establishing a clearance for a protruded portion used in connecting the existing fluid pipes;

wherein the contact portion of the contact member has an arcuate structure along the outer surface of the existing fluid pipe and has a V-shape in cross section, and a plurality of contact members are arranged in the recessed portion and come in contact with more than 30% of a circumferential length of the existing fluid pipe.

8. A reinforcement fitting according to claim 7 wherein the plurality of contact members arranged in the recessed portion come in contact with more than 80% of the circumferential length of the existing fluid pipe.

* * * * *

UNITED STATES PATENT AND TRADEMARK OFFICE
CERTIFICATE OF CORRECTION

PATENT NO. : 6,467,813 B1 Page 1 of 1
DATED : October 22, 2002
INVENTOR(S) : Takemura et al.

It is certified that error appears in the above-identified patent and that said Letters Patent is hereby corrected as shown below:

<u>Title page,</u>
Item [75], should read:

-- [75] Inventors: Yukio Takemura; Kikuo Saito; Kohtaro Morikawa; Seiichi Kamada, all of Osaka (JP) --

Signed and Sealed this

Twenty-fourth Day of June, 2003

JAMES E. ROGAN
*Director of the United States Patent and Trademark Office*